United States Patent [19]
Cadiou

[11] 3,749,466
[45] July 31, 1973

[54] ASH TRAYS FOR MOTOR VEHICLES
[75] Inventor: Jean Cadiou, Paris, France
[73] Assignee: S.A. Automobiles Citroen, Paris, France
[22] Filed: July 15, 1971
[21] Appl. No.: 163,026

[30] Foreign Application Priority Data
July 15, 1970 France .......................7026038

[52] U.S. Cl. ............................................. 312/245
[51] Int. Cl. ......................... A47b 67/02, A47f 5/08
[58] Field of Search................... 312/242, 245, 246, 312/248, 270, 211, 251, 212, 297; 206/19.5 C; 220/41

[56] References Cited
UNITED STATES PATENTS
2,097,480 11/1937 Visser............................ 312/242 X
2,208,971 7/1940 Gelardi .......................... 131/241 X
3,087,770 4/1963 Gettel .............................. 312/348 X Primary Examiner—Paul R. Gilliam
Attorney—Arnold Robinson

[57] ABSTRACT

An ash-tray, for a motor vehicle, is recessed in the dashboard of the vehicle and comprises a pivotal receptacle and a rigid, sliding, lid for closing the receptacle. Both when the receptacle is open or closed, substantially no part of the ash-tray protrudes beyond the surface of the dashboard.

8 Claims, 5 Drawing Figures

PATENTED JUL 31 1973 3,749,466
SHEET 1 OF 2
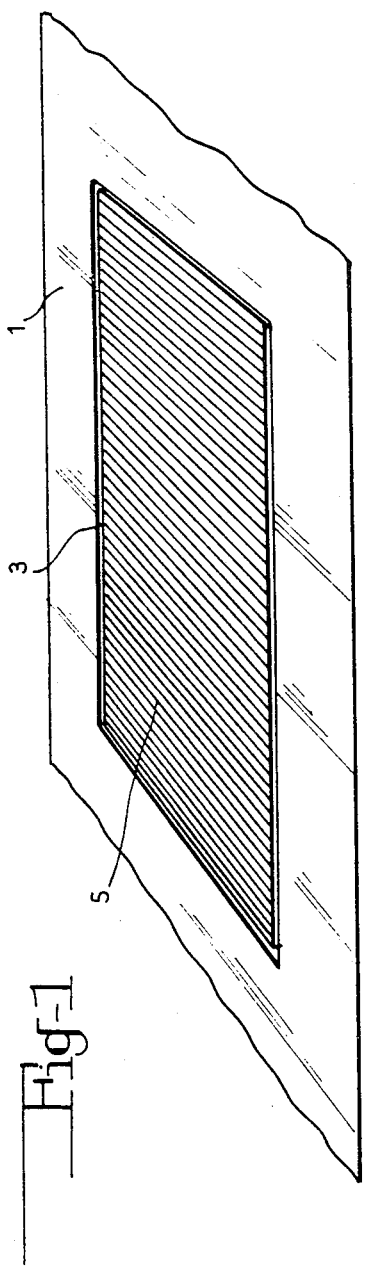
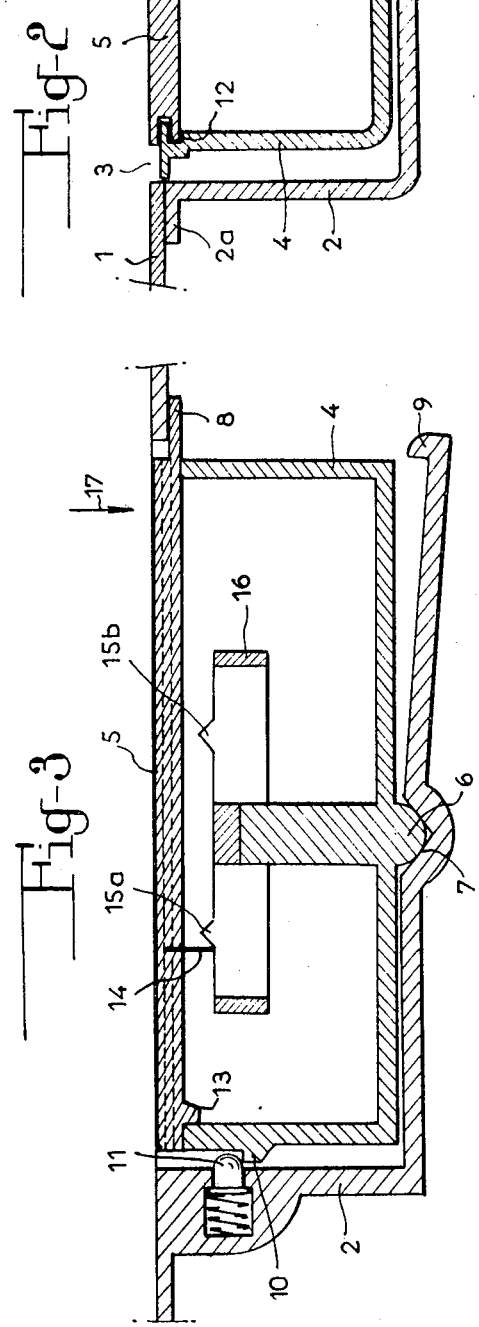

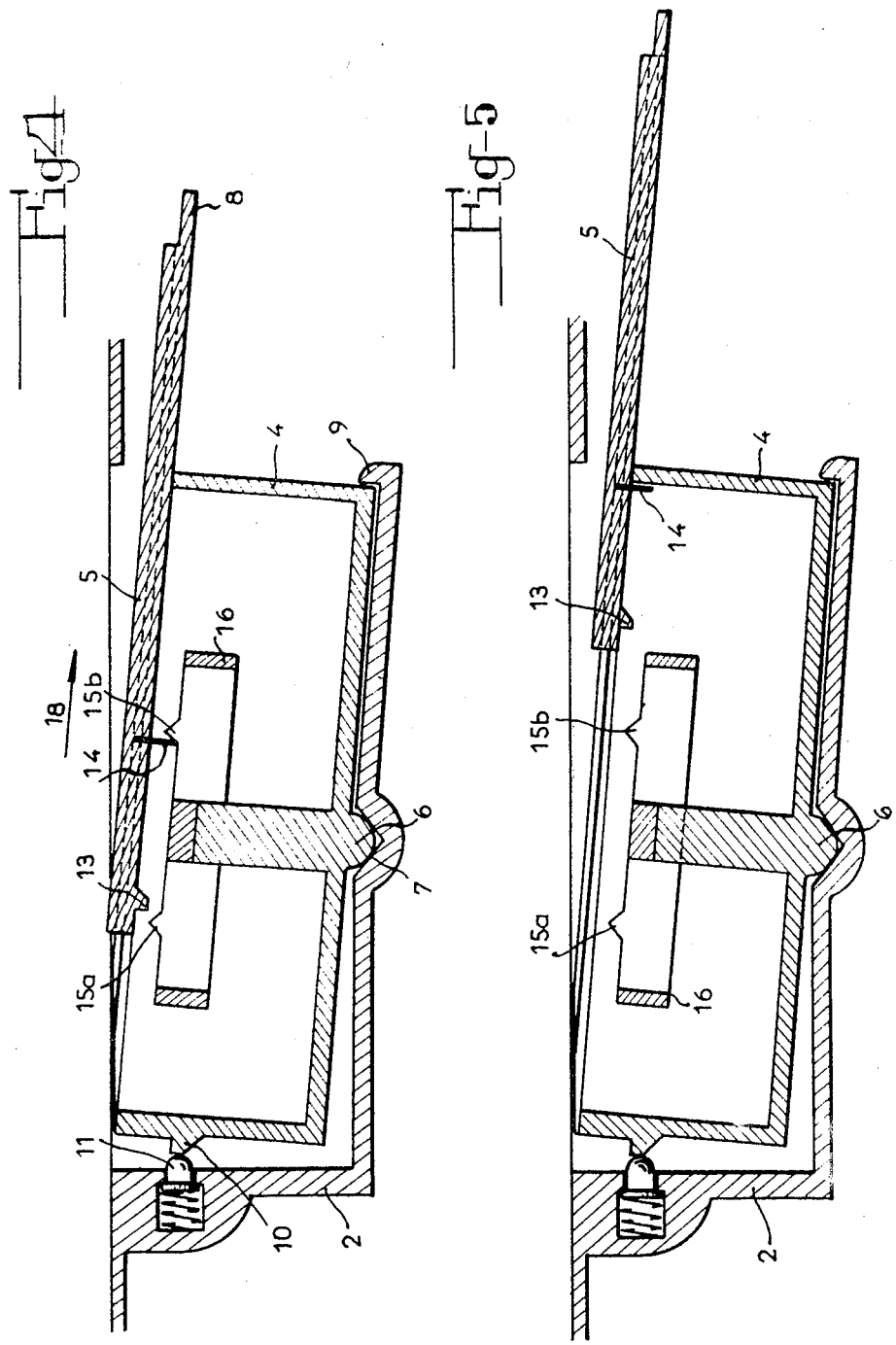

ASH TRAYS FOR MOTOR VEHICLES

BACKGROUND OF THE INVENTION

1. Field of the Invention.

The present invention relates to a receptacle such as an ash-tray, fitted with a lid, which is recessed into a surface such as, for example, the dashboard of a motor vehicle.

2. Description of the Prior Art.

In one form of hitherto proposed ash-tray for a motor vehicle, the ash-tray is mounted so as to tip in relation to its support and the lid of the ash-tray protrudes from the ash-tray casing, which might be dangerous in the event of an accident.

An object of the present invention is to provide an ash-tray or other receptacle having substantially no protruding parts, even when the lid is open.

SUMMARY OF THE INVENTION

According to the present invention, there is provided an assembly comprising a receptacle, a rigid sliding lid selectively closing and opening the receptacle, means defining a surface, having an opening therein, the receptacle being accommodated in the said opening, and means mounting the receptacle and lid for tilting movement relative to the surface about an axis extending transversely to the direction of sliding of the lid, the lid, when closed, lying substantially in the plane of the surface.

BRIEF DESCRIPTION OF THE DRAWINGS

An embodiment of the invention will now be described, by way of example only, with reference to the accompanying diagrammatic drawings, in which:

FIG. 1 is a perspective view of part of a dashboard into which an ash-tray in accordance with the invention is recessed;

FIG. 2 is a transverse cross-section of one half of the ash-tray shown in FIG. 1;

FIG. 3 is a longitudinal section of the ash-tray with a lid of the ash-tray closed;

FIG. 4 is a section similar to FIG. 3, but showing the lid partly open; and

FIG. 5 is a section similar to FIG. 3, but showing the lid fully open.

DESCRIPTION OF THE PREFERRED EMBODIMENT

The ash-tray, illustrated in the drawings, is recessed into the dashboard 1 of a motor car and comprises a mounting 2, held in place around an opening 3 in the dashboard 1 by flanges 2a, below the dashboard 1. A receptacle 4 is pivoted in the mounting 2, and a rigid lid 5 slides in the receptacle 4 in a direction at right angles to the pivotal axis of the receptacle 4.

The receptacle 4 has a projection 6, which engages in a recess 7 in the mounting 2 and acts as a knife-edge pivot. Pivotal or tipping movement of the receptacle 4 is limited in one direction by a projection 8, on the lid 5, which bears against the dashboard 1, and in the other direction either by a stop or by the shape of the mounting itself, as is the case in the embodiment illustrated. When the projection 8 is in contact with the dashboard 1, the lid 5 lies within the plane of the dashboard, as shown in FIGS. 1 and 3. A stop 9 forming part of the mounting, prevents the receptacle 4 from sliding down when in the inclined position.

The receptacle 4 has another projection 10, which engages under a stop 11, spring-mounted in the mounting 2, when the projection 8 is in contact with the mounting, that is to say when the ash-tray lies within the plane of the dashboard (FIGS. 1 and 3).

The lid 5 slides in the receptacle 4, guided by runners 12 (FIG. 2). At or adjacent the end of the lid 5, on its inner face, is a stop 13, which bears against one end wall of the receptacle 4 when the lid 5 is closed. The lid 5 also carries an intermediate stop 14, formed from a resilient material, in the path of movement of which lies two projecting stops 15a and 15b, forming part of a support 16 for partly smoked cigarettes, the support 16 being fixed to the receptacle 4. The stop 14 lies in contact with the stop 15a when the lid is closed (FIG. 3), and bears against the other end wall of the receptacle 4 when the lid is fully open (FIG. 5).

When the ash-tray is closed, the receptacle 4 is restrained against pivotal movement in one direction by the projection 10, which engages the stop 11, and in the other direction by the projection 8, which bears against the dashboard 1; movement of the lid 5, is prevented by the stop 13, in contact with one end wall of the receptacle, and by the stop 14, in contact with the stop 15a. In this position, the lid 5 lies in the plane of the dashboard 1.

To open the ash-tray, the lid 5 is pressed in the direction indicated by arrow 17 in FIG. 3 so that the stop 11 is moved inwardly by the projection 10, thus allowing the receptacle 4 to tip to the position shown in FIG. 4. This frees the lid 5, which can be slid open in the direction of arrow 18 in FIG. 4 the stop 14 riding over the stop 15a.

In the embodiment shown, the lid 5 can be held in a partly open position, with the stop 14 in contact with the stop 15b (FIG. 4), or in an almost fully open position, in which the stop 14 bears against the end wall of the receptacle 4 (FIG. 5).

It will be observed that the lid, when open, lies back beneath the dashboard 1 and is therefore not dangerous. Moreover, as the ash-tray slopes, the ash gravitates to a zone which is covered when the lid is in the partly open position (FIG. 4); there is thus no risk of its being blown about.

When the receptacle is in the tilted position shown in FIG. 4, but with the lid closed. it can be readily removed from the mounting 2 if grasped by the portion projecting above the dashboard 1 and can then be emptied and cleaned.

In the ash-tray particularly described, since the lid lies in the plane of the dashboard when closed, the receptacle is out of sight and does not alter the general line of the dashboard; in the event of an accident, it cannot cause injury. When the receptacle is open the lid is housed behind the dashboard and the receptacle again cannot cause injury in the event of an accident.

What is claimed is:

1. An assembly comprising
   a receptacle;
   a lid in sliding engagement with said receptacle;
   means defining a surface having an opening therein, said receptacle being accommodated in said opening on one side of said surface;
   mounting means with which said receptacle is in pivotal engagement for tilting movement between first and second positions, said lid being retained in a closed position by an edge of said opening in said surface when said receptacle is in said first position, and said lid clearing said edge and being slidable to an open position when said receptacle is in said second position.

2. An assembly according to claim 2 wherein said receptacle comprises a projection which is in pivotal engagement with said mounting means.

3. An assembly according to claim 3 wherein said mounting means comprises a recess in which said receptacle projection is received.

4. An assembly according to claim 12 further comprising
spring-biased stop means for retaining said receptacle in said first position in which the closed lid lies substantially in the plane of said surface.

5. An assembly according to claim 2 wherein said receptacle is an ash-tray, and further comprises support means for partially smoked cigarettes, including at least one stop means, and said lid includes stop means, said lid stop means cooperating with said support stop means to hold said lid in a predetermined position relative to said receptacle.

6. An assembly according to claim 5 wherein said lid stop means is resilient.

7. An assembly according to claim 5 wherein said support means includes two stop means, one of said support stop means cooperating with said lid stop means to hold said lid in its closed position, and the other of said support stop means cooperating with said lid stop means to hold said lid in a partially open position.

8. An assembly according to claim 3 wherein said lid includes stop means abutting the receptacle when said lid is fully open.

* * * * *